Figure 2:
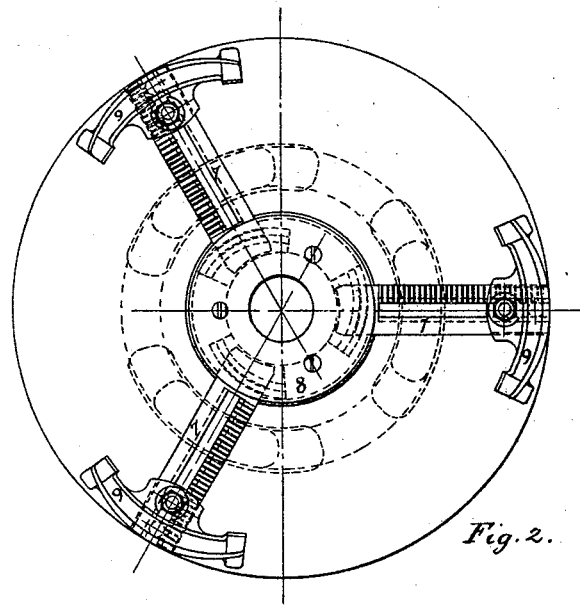

(No Model.)

2 Sheets—Sheet 1.

W. LEWIS.
BORING AND TURNING MILL.

No. 454,801.

Patented June 23, 1891.

WITNESSES:
John R. Phillips
E. R. Harper

INVENTOR
Wilfred Lewis (No Model.) 2 Sheets—Sheet 2.

W. LEWIS.
BORING AND TURNING MILL.

No. 454,801. Patented June 23, 1891.

WITNESSES:
John K. Phillips
E. R. Harper

INVENTOR
Wilfred Lewis

UNITED STATES PATENT OFFICE.

WILFRED LEWIS, OF PHILADELPHIA, PENNSYLVANIA, ASSIGNOR TO THE WILLIAM SELLERS & COMPANY, INCORPORATED, OF SAME PLACE.

BORING AND TURNING MILL.

SPECIFICATION forming part of Letters Patent No. 454,801, dated June 23, 1891.

Application filed March 28, 1891. Serial No. 386,829. (No model.)

*To all whom it may concern:*

Be it known that I, WILFRED LEWIS, of the city and county of Philadelphia and State of Pennsylvania, have invented a new and useful Improvement in Boring and Turning Mills, of which the following is a specification.

My invention relates, especially, to the driving and chucking machinery for boring-mills, which may have to perform the same operation successively on a number of similar pieces, and for which purpose a centering-chuck driven by power and opened and closed by hand has been most commonly employed. A good example of this form of chuck may be described to consist of three radial arms fitted to slots in the table and operated by a central cam-plate, which engages with the arms, causing them to move concentrically. These arms are usually provided with adjustable jaws, which can be set for work of various diameters, such as car-wheels or tires. When properly tightened, this form of chuck performs its function satisfactorily, but the time and labor involved in repeatedly tightening and loosening a large chuck is very great, and there is always the risk of having the work-shift undercut from insufficient grip.

In certain operations it is very difficult to obtain the necessary grip by hand-power, and slipping in the jaws is a common occurrence. To avoid these defects it is an object of my invention to produce a boring or turning mill with a self-tightening chuck, which shall automatically take a strong initial grip on its work with the starting of the chuck.

It is a further object of my invention to tighten the chuck automatically by the power required for boring or turning, and to loosen it by its own inertia.

It is a further object of my invention to combine the operations of chucking and unchucking with the simple operations of starting and stopping the chucking-table.

To these ends my invention consists in a boring or turning mill provided with a centering-chuck and self-tightening jaws, through which the initial grip upon the work is effected by the forces of friction and inertia in starting the chucking-table.

It further consists in a boring or turning mill provided with a self-tightening chuck, which releases itself by inertia when the motion of the driving-wheel under the chucking-table is quickly arrested.

It further consists in a boring or turning mill and a rotatable centering-chuck, in which the power for rotating the chuck is transmitted through the work which it centers.

Figure 1:
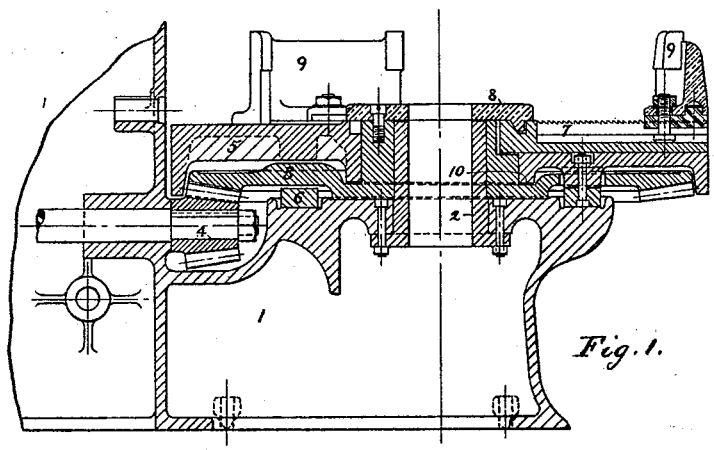
Figure 3:
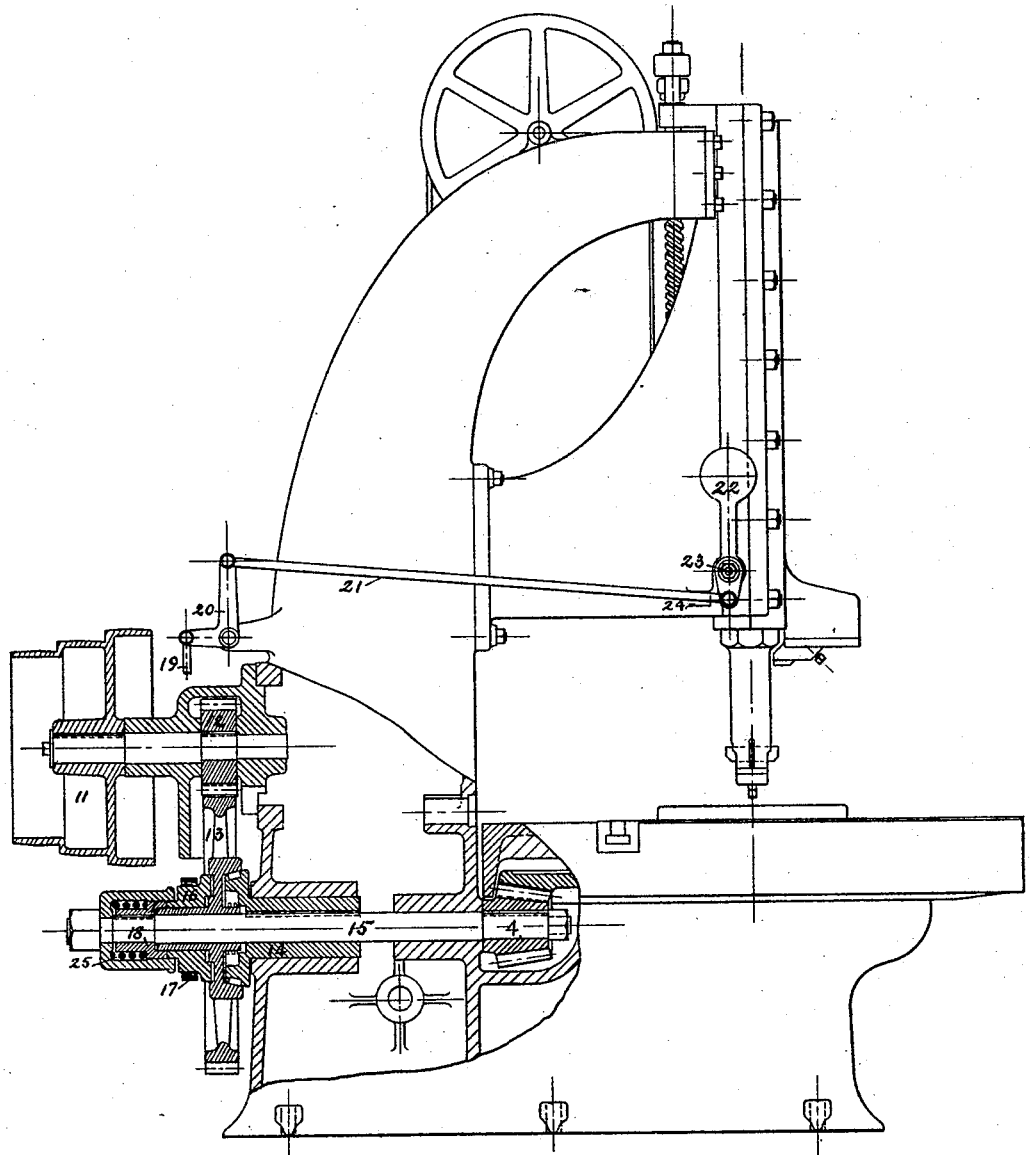

Referring to the drawings which form part of this specification, Figure 1 is a sectional elevation of a boring-mill, showing the driving-gear and chucking-table. Fig. 2 is a plan of the chucking-table, showing the adjustable jaws and driving cam-plate. Fig. 3 is a side elevation of the boring-mill with a portion of the upright broken away to show the driving-clutch and brake by which the table is started and stopped.

In the figures corresponding parts are denoted by the same numbers.

1 is the mill-housing.

2 is a bushing bolted to 1 to form a center about which the table turns.

3 is the driving-wheel, which rests on the housing 1 and turns about the bushing 2 as a center.

4 is the driving-pinion, which engages with the wheel 3.

5 is the chucking-table, which centers on the driving-wheel 3 and rests upon the ring 6, which in turn rests upon the housing 1.

7 7 7 are the radial arms of the chuck operated by the cam-plate 8. The cam-plate 8 is bolted to and driven by the driving-wheel 3.

9 9 9 are the adjustable jaws of the chuck, which are secured to the radial arms 7 7 7.

It will be seen from the drawings that the plate of the driving-wheel 3 is cut away at intervals to permit lugs on the table 5 to pass through and attach to the ring 6. The slots in the wheel 3 serve also as stops to limit the movement of the driving-wheel relative to the chucking-table 5. In this way the driving-wheel 3 and chucking-table 5 are both supported from the housing independently of each other, so that the chucking-table 5 may be held by the friction of its own weight and that of the work which it centers while the driving-wheel 3 rotates and tightens the jaws. When the jaws 9 9 9 are drawn by the cam-plate 8 and arms 7 7 7 against the wheel to be centered and driven, the resistance to further tightening becomes so great that the chucking-table is started by the cam-plate acting against the arms 7 7 7. The spiral of the cam-faces should be such that no recoil can take place, and so that the greater the resistance the tighter the chuck will hold. When the work of boring or turning is completed, the construction of the driving mechanism is such that a brake may be at once applied to the shaft of the pinion 4. This checks the motion of the driving-wheel 3, while the chucking-table 5 continues to rotate, by its inertia opening the chuck-jaws and releasing the work just finished. The mechanism by which the chucking-table is thus started and stopped is shown particularly in Fig. 3. This mechanism has been shown and described in Letters Patent No. 421,178, issued February 11, 1890, and it is therefore unnecessary to do more at present than indicate its operation on the boring-mill.

11 is the driving-cone, which imparts motion through the pinion 12 to the clutch-wheel 13.

14 is a friction-cone keyed to the shaft 15, and 16 is the engaging member of the machinery for transmitting and arresting motion under the control of the brake-strap 17.

18 is the spring-abutment, which gages the pressure on the friction-clutch in driving. The brake-strap 17 is tightened or loosened by the rod 19, leading to the bell-crank 20, which in turn is operated by the rod 21 and counterweighted lever 22. This lever is shown in its middle position, but being thus in unstaple equilibrium it must fall by gravity to the right or left on its fulcrum 23. If turned to the right against the stop 24, the brake-strap will be loosened and the engaging member 16 will turn by friction against the wheel 13 and jam the latter against the friction-cone 14 under the pressure of the spring 25. The full power of the driving-clutch thus acts at once to start the driving-wheel 3 and close the jaws of the chuck against its work until finally the inertia of the chucking-table gives a strong initial grip before the work of turning or boring begins. If now the lever 22 is moved to the left beyond the position shown, the brake-strap 17 will be tightened upon the engaging member 16, causing it to stop and release the pressure on the friction-cone 14, while it operates to arrest motion of the driving-wheel 3. The resistance thus suddenly applied to the driving-wheel 3 checks its motion, while the chucking-table 5 continues to rotate by its inertia and opens the jaws of the chuck.

It will be observed that the driving-faces of the operating-cams are inclined instead of vertical. This is not an essential feature; but the construction as shown is preferred to counteract the tendency of the arm 7 to tilt when pressure is applied at the end of the jaw 9. A slight amount of clearance is allowed between the driving-wheel 3 and chucking-table 5 at the surface 10, and as a result the driving-wheel 3 is lifted against the chucking-table 5 by the inclined cam-faces when a wheel is tightly chucked, and the weight of both 3 and 5 is then carried on the ring 6 against the housing 1. It is not absolutely necessary that the chucking-table 5 should project through the driving-wheel 3 and rest upon the housing 1, although the construction as shown is preferred. The chucking-table 5 may rest directly upon the driving-wheel 3 at the surface 10; but then, if the driving-wheel is started slowly, the friction at 10 may be sufficient to start the chucking-table without causing any action of the chuck-jaws. On the other hand, if the driving-wheel is started quickly, the inertia of the chucking-table will be sufficient to produce a relative movement of the driving-wheel and chucking-table and close the jaws. The action in stopping is the same, whether the chucking-table rests on the driving-wheel, or on the housing, as shown; but the action in starting is uncertain unless the chucking-table is held by friction, as provided in the construction shown. When the chucking-table rests on the driving-wheel, the initial closing of the jaws depends wholly upon the inertia of the chucking-table; but when the chucking-table rests upon the housing, as shown, the friction on its bearing is of great assistance, and the inertia of the chucking-table comes into play to give a final grip as the table starts. The inertia of the chucking-table is therefore an important and powerful factor in gripping and releasing the work, whether friction acts favorably or unfavorably. The chuck may therefore be said to be tightened or loosened by its own inertia; but to give the best results the effects of inertia must be carefully studied, so that at no speed shall the inertia to be overcome exceed the safe resilience of the working parts.

Various devices might be shown to relieve the working parts from undue strain at high speed; but such devices do not properly come within the scope of my present invention.

Having now described my invention, what I claim as new, and desire to secure by Letters Patent, is—

1. A boring or turning mill provided with a rotatable centering-chuck and self-tightening jaws, through which the initial grip upon the work is effected by the forces of friction and inertia, with the rotation of the chuck.

2. A boring or turning mill provided with a self-tightening chuck which releases itself by inertia when the motion of the driving-wheel under the chucking-table is quickly arrested.

3. A boring or turning mill and a rotatable centering-chuck, in which the power for rotating the chuck is transmitted through the work which it centers.

WILFRED LEWIS.

Witnesses:
JOHN D. PHILLIPS,
E. R. HARPER.